June 20, 1967  C. F. AUBERSON  3,326,496
ADJUSTABLE PNEUMATIC TUBE AND PNEUMATIC PRESSURE BOOSTERS
Filed Jan. 21, 1965  4 Sheets-Sheet 1

INVENTOR
C. F. AUBERSON
BY
John E. Cassidy
ATTORNEY

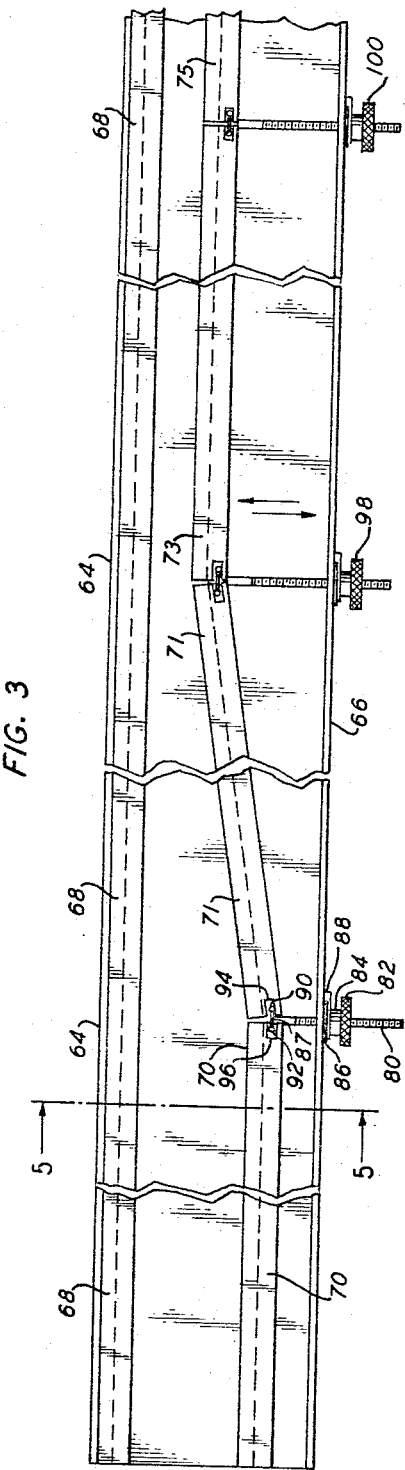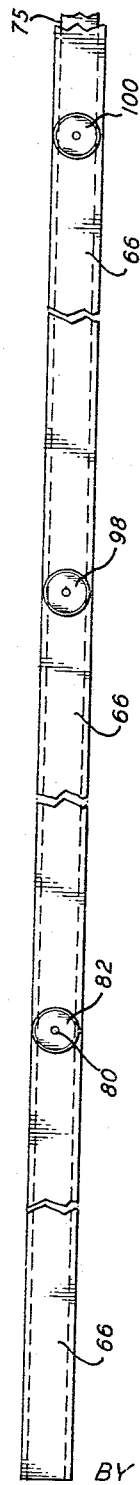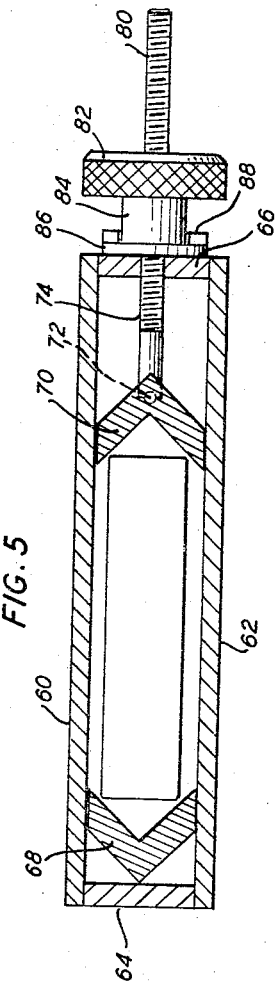

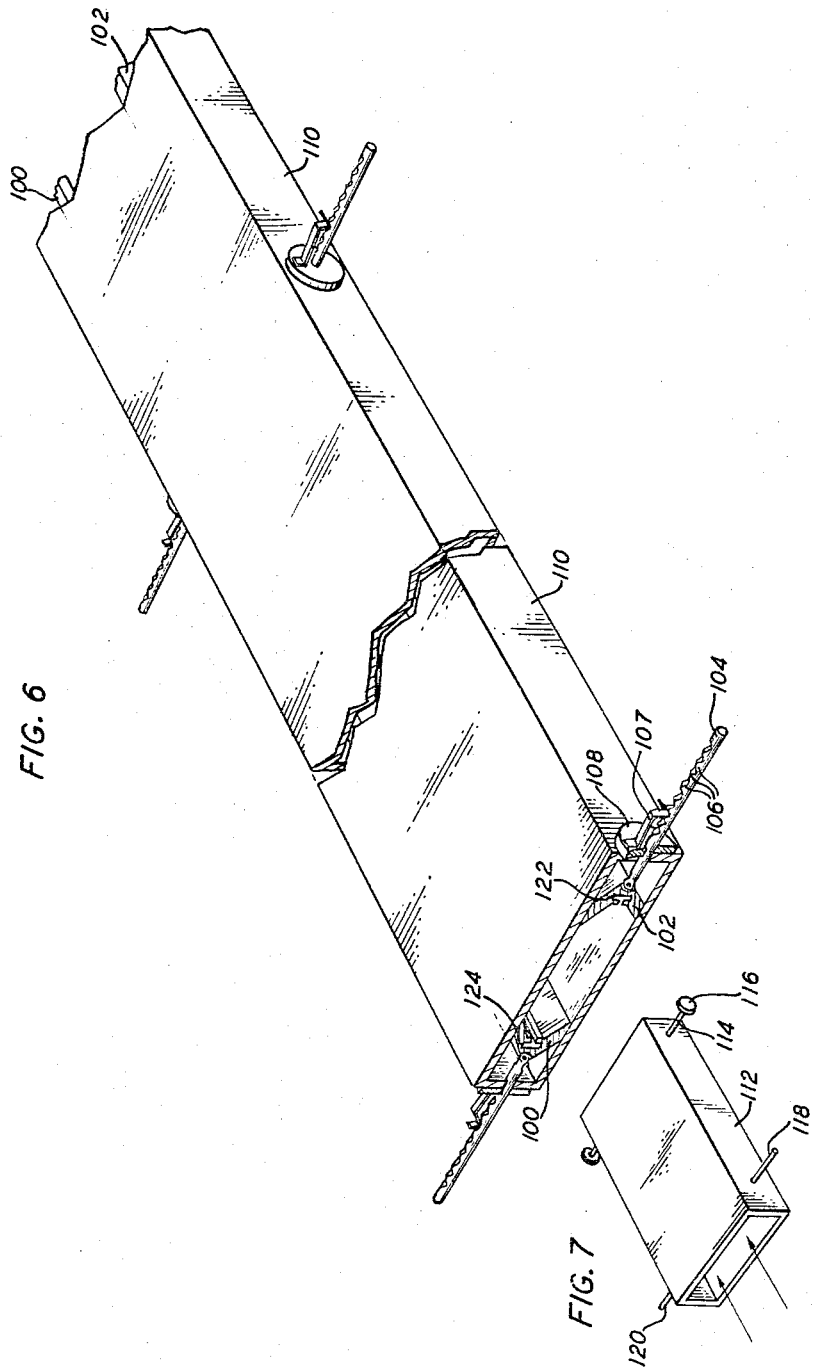

June 20, 1967     C. F. AUBERSON     3,326,496
ADJUSTABLE PNEUMATIC TUBE AND PNEUMATIC PRESSURE BOOSTERS
Filed Jan. 21, 1965     4 Sheets-Sheet 4
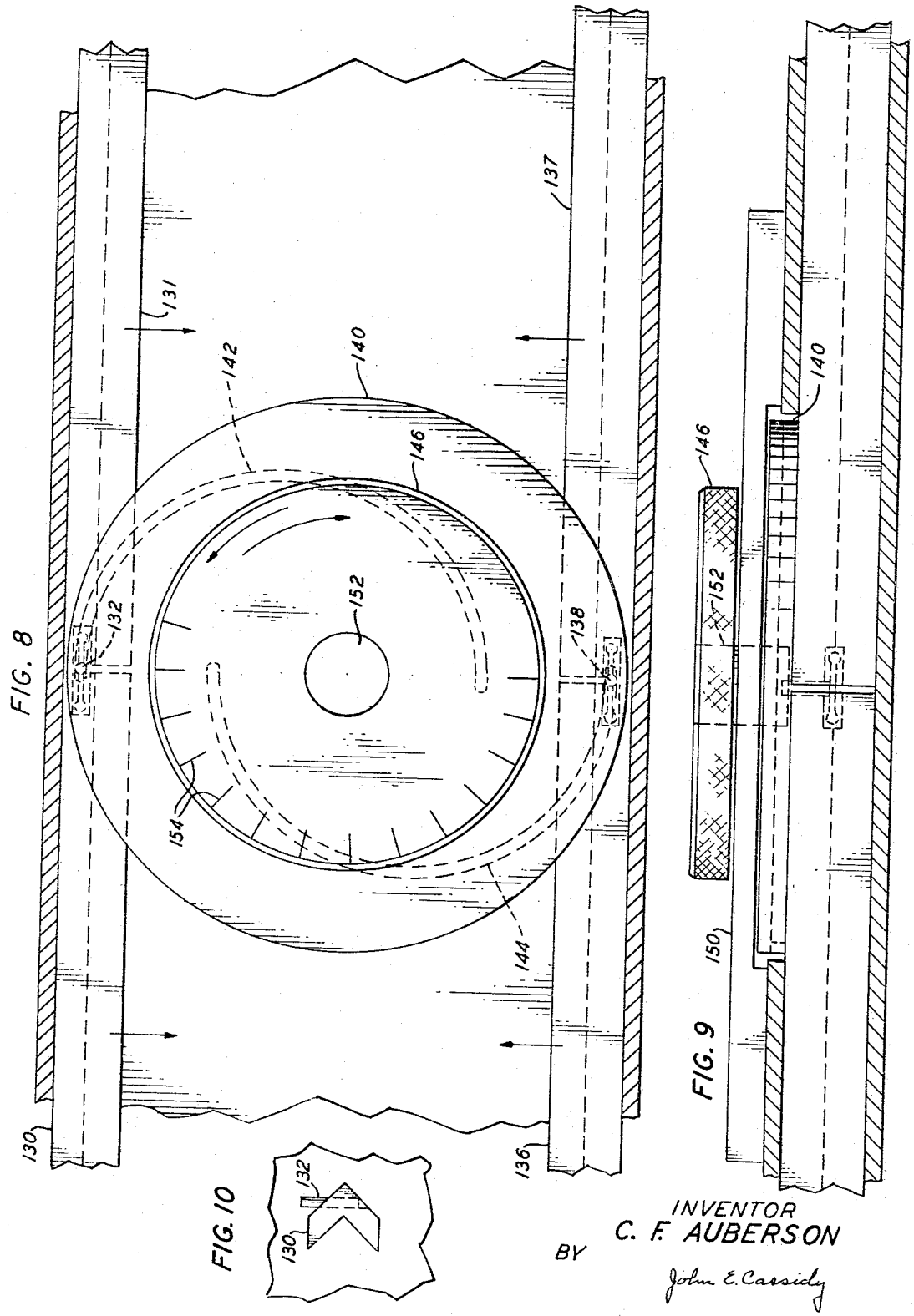
INVENTOR
C. F. AUBERSON
BY John E. Cassidy
ATTORNEY United States Patent Office 3,326,496
Patented June 20, 1967

3,326,496
ADJUSTABLE PNEUMATIC TUBE AND PNEUMATIC PRESSURE BOOSTERS
Casimir Fernand Auberson, Greenwich, Conn., assignor to American Machine and Foundry Company, a corporation of New Jersey
Filed Jan. 21, 1965, Ser. No. 426,844
8 Claims. (Cl. 243—6)

This invention is an improved pneumatic conveying system.

The object of the invention is the improvement of pneumatic conveying systems.

The present invention comprises an improved pneumatic channel structure, designed to minimize friction, and an improved pneumatic relay, or pneumatic pressure booster, which facilitates the interconnection of channel sections to make channels readily extensible without practical limitation as to length.

The improved channel structure comprises a casing enclosing elongated spaced opposed rails having 90 degree angular cross section standing on edge. The rails coact to support an article which is to be conveyed so that the lower surface of the article is raised from the bottom of channel casing and the lower side edges of the article make only substantially linear engagement with the opposed lower portion of the channel rails, which are disposed so as to cradle the article between them and elevate it from the channel bottom.

A feature of the invention therfore is a pneumatic conveying channel having opposed rails having angular cross sections for conveying an article so that its lower surface is spaced from the bottom of the channel.

The channel is adjustable so that it may accommodate articles of differing sizes.

Another feature of the invention therefore is a pneumatic channel having opposed angular side rails which may be adjustably spaced one from another to accommodate articles of differing sizes.

In one embodiment, the channel side rail structure is arranged so that one of the angle side rails is displaceable with respect to the other. In another embodiment both rails are adjustable. It is this adjustability which makes it possible to support articles of differing sizes between them.

With the side rails disposed as described, an article shaped in the form of a rectangular package of cigarettes or cigars, for instance, may be conveyed so that neither the top nor bottom surface of the article makes engagement with the top or bottom surface of the channel. The air or gas under pressure which drives the article through the channel forms a layer beneath the article to tend to lift it off its supporting rails and also forms a layer above the article to tend to prevent it from engaging the upper portion of the rails. The article is literally blown through the channel with only occasional contact between the edges of the article and the rails.

One important object of the invention is to minimize damage to the conveyed articles, which ordinarily would be caused by engagement with the various channel surfaces, by limiting the contacting areas of channel and article.

The system is arranged so that it may be extended without practical limit as to length. It may comprise a number of channel sections, the output of one channel section being connected to the input of another channel section through a pneumatic relay, or pressure booster, along the channel length indefinitely. To this end in the present invention, the pneumatic relays, or pressure boosters, are so constructed that they interpose no obstruction between an incoming and outgoing channel section. The conveyed articles move through the relay, or pressure booster, without stopping or changing in direction.

The improved relay, broadly, is a sleeve interconnecting an incoming channel section and an outgoing channel section, and comprises means for interconnecting a source of air, or gas, under pressure, through a relatively spacious hollow chamber in the relay, which communicates through a nozzle formed in the relay, which nozzle closely embraces the termination of the incoming channel and is directed toward the input of the outgoing channel. The arrangement tends to evacuate the air, or gas, near the end of the incoming channel section, producing a negative pressure or suction therein, thereby accelerating an incoming article, and directs the article into the entrance of the outgoing channel section through which it is blown by the air pressure behind it.

The invention may be understood from the following description, when read with reference to the associated drawings, which taken together disclose a preferred embodiment of the system, comprising the channel and the booster, together with alternative arrangements of the channel. It is to be understood however that the invention is not limited to the arrangements disclosed herein, but may be incorporated in other embodiments which may be suggested to those skilled in the art from a consideration of the following.

In the drawings:

FIG. 3 is a plan view of a channel section with the top removed to show the interior construction;

FIG. 4 is a front elevation of the channel section of FIG. 3 with the cover in position;

FIG. 5 is a transverse left-end section taken on line 5—5 of FIG. 3 with the channel section top in position;

FIG. 6 is a perspective of a channel section and adjustable channel side-wall or rail;

FIG. 7 is a perspective of a travelling adjuster used in adjusting the spacing of the rails;

FIG. 8 is a top plan view partly in section of a portion of a channel, with top removed, showing another embodiment of the rail spacing arrangement;

FIG. 9 is a front elevation, partly in section, of the embodiment of FIG. 8;

FIG. 10 is a right-hand end view of a portion of FIG. 8 showing the rail and the rail space adjusting pin.

Figure 1:
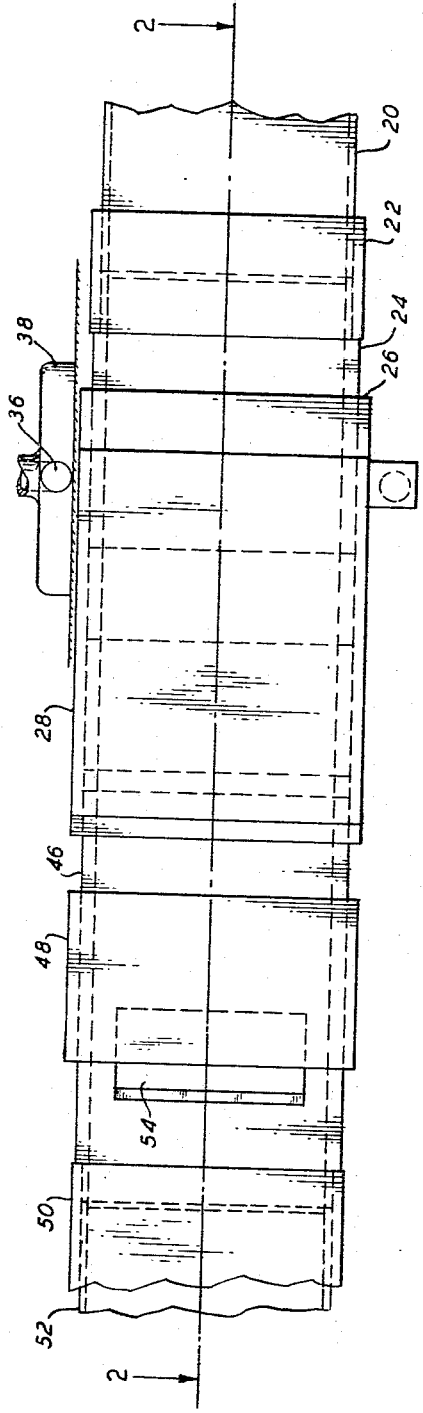
FIG. 1 is a top plan view of a pneumatic relay, or pressure booster, interconnecting an incoming pneumatic channel section, shown at the right, with an outgoing pneumatic channel section, shown at the left, in the figure.
Figure 2:
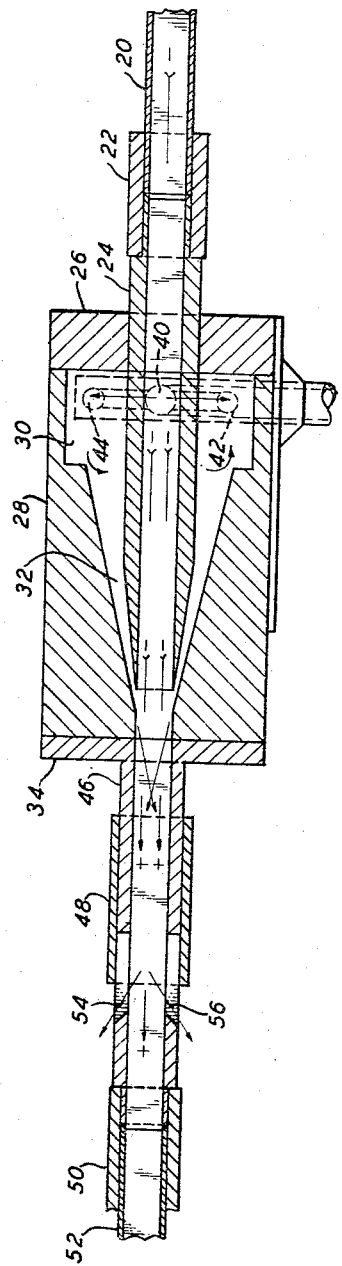
FIG. 2 is a longitudinal cross section taken on line 2–2 of FIG. 1.

Refer now to FIGS. 1 and 2 which show the terminations of two pneumatic channel sections, one incoming and one outgoing, interconnected by a pneumatic relay or pressure booster. The angle rails of the assembly are omitted for clarity. It is to be understood however that they extend without interruption through the system from end to end.

The rectangular tube 20 of the incoming channel conveying section is connected by means of a sleeve element 22 to the incoming channel terminating tube 24 of the pressure booster relay. The tube 24 projects through the relay end section 26 which aligns it within the interior of the relay body 28. The central portion of relay body 28 comprises a relatively spacious hollow chamber 30 which communicates with a nozzle portion 32. The nozzle 32 closely confines the terminating tube 24 of the incoming channel section. Air or gas under pressure is supplied from a source, not shown, through an aperture 36 in the relay support bracket 38 which may be secured, to a post, a wall, or a ceiling, for instance, in any convenient manner. The aperture 36 in the bracket communicates through a duct in the bracket to an opening 40 in the incoming channel terminating tube 24 and through openings 42 and 44 into the hollow chamber 30.

The hollow chamber 30 is of relatively large capacity and serves as a pressure storage source, in which variations in the pressure head tend to be equalized and which maintains a constant relatively even flow of gas under pressure through nozzle 32. The disposition of the nozzle, closely confining the left-hand end of tube 24, creates a negative pressure, or suction in the region within tube 24 near its left-hand end. This together with the pressure applied through aperture 40 accelerates the incoming article, which is directed through an aperture in the end wall 34, tube 46, slide valve 48 and splicing element 50 to the input 52 of the outgoing channel. The slide valve 48 may be adjusted to close as much as desired of openings 54 and 56 to regulate the pressure and the speed with which the articles are propelled through the channel.

Refer now to FIGS. 3, 4 and 5, which together show the details of construction of a first embodiment of a channel section with the opposed 90 degree angle side rails standing on edge and means for adjusting the position of one with relation to the other, the position of which other is fixed.

The casing of the channel section as illustrated is rectangular in transverse cross section. It is to be understood however that it may be square, circular, eliptical, or other, if preferred. The shape of the relay, or pressure booster, would obviously be arranged to conform to the shape of the channel. The casing, as illustrated, comprises a top 60, a bottom 62 and sides 64 and 66. Within the casing are the opposed rails, preferably of 90 degree angle transverse cross section, standing on edge. The rail 68 shown at the top of FIG. 3, and at the left in FIG. 5, in this embodiment is fixed in position, preferably by welding to the side 64. The rail opposing rail 68 comprises articulated rail sections 70, 71, 73 and 75 which are arranged so that the spacing between them and fixed rail 68 may be adjusted. As shown in FIG. 3, rails 70, 71, 73 and 75 may be assumed to be in process of adjustment. It may be assumed that all of the adjustable rails were heretofore in rectilinear alignment with rail 75, for instance, and parallel to rail 68 to convey relatively narrow articles. The rail 70 has been displaced more widely to a new position by the adjusting mechanism to be described hereinafter. The rails 71, 73 and 75 are to be similarly adjusted into rectilinear alignment with rail 70 and parallel to rail 68 to convey wider articles.

One preferred means of adjusting the rails is indicated in FIGS. 3, 4 and 5. It comprises a screw threaded rod 80 which passes through an axial threaded aperture in a rotatable knob 82, collar 84, an integral flange 86, channel section side 66 and is terminated in a short transverse rod 87 which may have somewhat enlarged spheres 90 and 92 at its opposed ends. The termination comprising rod 87 and spheres 90 and 92 are loosely lodged in relatively small median apertures 94 and 96 in the opposed ends of the two adjacent rails 70 and 71. The rail adjusting structure is fixed in position by a guide element 88 welded to channel casing side 66. The threaded rod 80 may advantageously be provided with a flattened graduated surface. As the knob 82 is turned in one direction, the threaded rod 80 moves in a direction to draw the ends of rails 70 and 71 away from rail 68. When rotated in the opposite direction the ends of rails 70 and 71 are pushed toward rail 68. Knobs 98 and 100 may be similarly rotated to align the rail sections 71, 73 and 75, so that they are in rectilinear alignment with rail 70 and spaced as required from rail 68 to accommodate the wider packages which, it is assumed are now to be conveyed.

As mentioned heretofore, the rails pass from end to end of the system through as many pneumatic conveying sections and interconnecting pneumatic relay pressure boosters as may be required, incident to the length of the system, the mass of the articles being conveyed and the speed at which it is desired to move them through the system. The mechanism by means of which the rails may be adjusted is not affected by reason of passage through a pressure booster rather than a conveying section. This applies to each of the embodiments described herein.

Refer now to FIG. 6 which shows another embodiment wherein the spacing of each of the angular rails within the conveyor casing is adjustable, and to FIG. 7 which shows a gauge, or traveling adjuster, for spacing the rails to accommodate a package of one particular width. The gauge is driven through the system pneumatically and in the transit adjusts the rail spacing to accommodate a particular package. An individual gauge is required for each package of different width.

In FIG. 6 the rails such as 100 and 102 each preferably comprise a number of articulated sections as described for FIGS. 3, 4 and 5. However, for certain applications, such as for a relatively short system, they may each be made in a single continuous length. A rod having serrations 106 along its upper surface, for instance, projects loosely through a collar 108, which collar is preferably welded to the channel section side 110 and through section side 108. The rod 104 may be pinned to an end of rail 102, or secured as described for rod 80 in FIGS. 3, 4 and 5, if the rail sections are articulated, or arranged in any suitable manner.

A flat spring 107 is secured at one end to collar 108 and its free end is formed to engage with any registering serration 106 in rod 104. Other corresponding mechanism may be spaced along the system to fix the position of rod 102, after adjustment in a manner to be described. Rod 100 is similarly equipped.

FIG. 7 shows the gauge, or travelling rail space adjuster, which may preferably be a hollow rectangular element having a width corresponding to packages of the particular size which are to be conveyed through the system at a particular time.

In FIG. 7, securely fixed in a side wall of the travelling adjuster near its forward end is a short rod 114 terminating at its free end in an enlarged button 116. A similar rod and button are affixed in lateral alignment with rod 114 and button 116 to the opposite side of the adjuster. Another pair of rods 118 and 120 having no button terminations are affixed to the opposite sides of the gauge near its rear end.

Rails 100 and 102 are each provided with a longitudinal track 122 and 124 in the form of a T shaped groove 122 and 124 turned through a right angle clockwise and counterclockwise, respectively, which accommodate the buttons such as 116 while rods 118 and 120 trail in the tracks. As a particular gauge is blown through the channel, the buttons set the rails at the proper spacing, moving the rods, such as 104, inwardly or outwardly, with respect to the casing sides, against the resistance of spring 107, the tension of which is set to permit the displacement, to effect the adjustment. The springs such as 107 lock the assemblies in the adjusted position for the particular articles. As mentioned heretofore a different size gauge, or travelling adjuster, such as that shown in FIG. 7, is required to adjust the rails for each package of different width.

Refer now to FIGS. 8 and 9 which show another and faster acting embodiment of the arrangement for adjusting the spacing of the articles for conveying packages of differing sizes.

In FIG. 8 the channel cover is not shown. The rails 130 and 131 are articulated as heretofore described and have secured in the coupling a pin 132 which project vertically above the rails. The rails 136 and 137 are similarly arranged and have a similar pin 138. A disc 140 is provided with two cam tracks 142 and 144 in its under surface which engage the pins. The disc may be rotated by means of the knob 146 secured to the disc. Rotation of the knob and of the cam track clockwise or counterclockwise actuates the pins 132 and 138 and the rails simultaneously toward or away one from the other. A turn of the knob through 180 degrees actuates the track pins and rails through their full range. The cam mechanism, as shown in FIG. 9, is supported by a plate 150 fixed to the top of the channel. The plate has a central boring to accommodate a short stud 152 to which the cam 140 and the knob 146 are secured in any suitable manner. The under surface of the plate 150 is recessed to receive the cam 140. The knob 146 may be provided with graduations 154 to facilitate setting the rails at any spacing to accommodate the packages which are to be conveyed.

Attention is called to the fact that the relay or pressure booster has been described as being disposed intermediate two channel sections.

Reference to FIG. 2 however indicates that the relay is designed so that it may serve at the position where articles are received for transit through the system.

In one embodiment duct 20 and sleeve 22 are dispensed with, the opening 40 is closed and the duct leading from aperture 36 in bracket 38 is connected directly to openings 42 and 44 in chamber 30. The articles are inserted in duct 24 and drawn through it by suction, or negative pressure, produced in duct 24 by the effect of air in nozzle 32.

In a second embodiment, the right-hand end of incoming terminating duct 24 is closed, outgoing duct 52 is spaced from the end of duct 46 and sleeve 50 is modified to close the bottom junction between these ducts while permitting the incoming packages to be received through an opening in the upper portion of sleeve 50. The packages may be fed through the opening by any suitable means such as by conveyor.

The system of the invention is not limited to rectilinear conveyance. The casing and rails may be bent through curves of proper radius to permit changes of direction. Typical installations include arrangements in which the articles are directed generally upwardly from a machine based on one level, bent through a rising curve of proper radius, then generally horizontally at another level, adjacent a ceiling for instance, then through a downward curve and vertical run to a packing machine for instance. Obviously, with proper choice of curved sections there is no limitation on changes in direction. The system is intended for wide general use, including indoor, outdoor, aerial and subterranean application alone and in combination.

Inherent in the system are a number of characteristics which commend it including a reduction in fire hazard over electrical and other conveying systems and lessened opportunity for pilferage because of the complete enclosure of the articles from end to end of the conveyor.

What is claimed is:

1. In a pneumatic conveying system a relay having means therein for raising the pneumatic pressure between a pneumatic article conveying channel incoming to said relay and a pneumatic article conveying channel outgoing from said relay, a termination in said relay for said incoming channel, a pneumatic nozzle in said relay closely confining said termination for directing gas under pressure past said termination toward said outgoing channel and a valve located in said outgoing channel for regulating the pneumatic pressure in said outgoing channel only.

2. A relay in accordance with claim 1 in which said outgoing channel has means defining an opening therein to the ambient and in which said valve is a slidable sleeve element about said outgoing channel for adjusting the size of said opening.

3. A pneumatic conveying system for conveying substantially rectangular articles having at least one pair of opposed side edges, said system comprising a pneumatic channel, said channel having opposed spaced elongated guide rails each having an angular transverse cross section, said rails disposed in a manner to cooperatively support the side edges of said article between them and so that said articles are spaced from the lower surface of the channel.

4. A pneumatic conveying system in accordance with claim 3 in which said rails are disposed in a manner to prevent engagement between both the upper and lower surface of said article and the upper and lower surface of said channel.

5. A pneumatic system for conveying substantially rectangular articles having at least one pair of opposed side edges of a first size at a first time and articles of a second size, different from said first size, at a second time, said system comprising a pneumatic channel, said channel having a pair of spaced opposed guide rails for cooperatively maintaining said articles by said side edges in a position spaced from the bottom surface of said channel during transit through said channel, at least one of said guide rails being movably mounted within said channel and being provided with means for adjusting from without said channel the spacing of said one guide rail with respect to said other of said rails so that said articles of said first size and of said second size are maintained in said position at said first and said second times.

6. A system in accordance with claim 5 in which said one guide rail comprises a plurality of articulated guide rail sections and in which said adjusting means is a coupling between adjacent ones of said rail sections and means for reciprocating said coupling to change the spacing of said rail.

7. A pneumatic conveying system comprising a pneumatic conveying channel, a pair of spaced opposed guide rails in said channel for supporting articles conveyed through said channel, and means for adjusting the spacing of said rails to support articles of differing size, said means comprising an individual gauge for each article of different size and means responsive to the transit of any one of said gauges through said channel for spacing said rails for an article of some one particular size.

8. A system in accordance with claim 7 having means connected to said rails responsive to said spacing for securing them in position.

References Cited

UNITED STATES PATENTS

| 658,102 | 9/1900 | Bavier | 243—9 |
| 690,675 | 1/1902 | Taisey | 243—38 |
| 696,305 | 3/1902 | Bemis | 243—18 |
| 1,943,451 | 1/1934 | Needham | 243—25 |
| 2,176,439 | 10/1939 | Taylor et al. | 243—38 |

FOREIGN PATENTS 378,598   7/1923   Germany.

SAMUEL F. COLEMAN, *Primary Examiner.*